United States Patent [19]
Kono et al.

[11] Patent Number: 5,883,681
[45] Date of Patent: Mar. 16, 1999

[54] VIDEO PROJECTOR

[75] Inventors: Keizo Kono, Hachioji; Satoru Moriya, Noda; Tatsumi Takahashi, Ibaraki-ken; Masao Nozaki, Kawasaki, all of Japan

[73] Assignee: Victor Company of Japan, Ltd., Yokohama, Japan

[21] Appl. No.: 850,548

[22] Filed: May 2, 1997

Related U.S. Application Data

[63] Continuation of Ser. No. 509,505, Jul. 28, 1995, abandoned.

[30] Foreign Application Priority Data

Jul. 29, 1994  [JP]  Japan .................................. 6-197352

[51] Int. Cl.$^6$ ................................ H04N 5/74; G02F 1/00
[52] U.S. Cl. .......................... 348/751; 348/757; 353/34; 353/37; 359/634
[58] Field of Search .................................. 348/750, 751, 348/752, 756, 757; 353/31, 34, 37, 40; 349/56, 58, 61, 62, 63, 67, 68; 359/634, 246; H04N 5/74, 9/31

[56] References Cited

U.S. PATENT DOCUMENTS

| | | | |
|---|---|---|---|
| 4,191,456 | 3/1980 | Hong et al. .............................. | 348/751 |
| 4,425,028 | 1/1984 | Gagnon et al. .......................... | 348/751 |
| 4,827,334 | 5/1989 | Johnson et al. ......................... | 348/752 |
| 4,850,685 | 7/1989 | Kamakura et al. ...................... | 348/757 |

FOREIGN PATENT DOCUMENTS 5-158167  6/1993  Japan .
6-208099  7/1994  Japan .

OTHER PUBLICATIONS

"ILA Video Projector" by S. Nakagaki et al., ITE Technical Report vol. 17, No. 10, PP11–15, ALT 93–3 (Jan. 1993).

"ILA Super Projector in which 'High Intensity' is compatible with 'High Reolution'" by Tadayoshi Miyoshi, Electronic Life magazine published Sep. 1993.

*Primary Examiner*—Michael Lee
*Attorney, Agent, or Firm*—Michael N. Meller

[57] ABSTRACT

The present invention provides a video projector equipped with a projection lens system having only one optical axis for projecting a plurality color images displayed on a plurality of CRTs. The color images displayed on the CRTs 2R, 2B and 2G are respectively focused onto a writing side of respective spatial light modulators 4R, 4G and 4B through a plurality of writing lens 3R, 3G and 3B. On the other hand, a light from a reading light source 5 is divided into 3-color lights of R, G and B by a cross-type 3-color separation member 25. The three color lights are respectively inputted into a reading side of the respective spatial light modulators through a plurality of polarization beam splitter blocks 26R, 26G and 26B each having a pair of dielectric multiple layers 26a, 26b disposed parallel to each other. A plurality of reading light outputted from the spatial light modulators are synthesized and outputted as a composite color light by a cross-type 3-color composition member 28 so as to be projected with a magnification onto a screen by the projection lens system.

3 Claims, 12 Drawing Sheets

VIDEO PROJECTOR

This application is a continuation of application Ser. No. 08/509,505, filed Jul. 28, 1995 now abandoned.

BACKGROUND OF THE INVENTION

1. Field of the Invention

This invention relates to a video projector, and particularly relates to a color video projector constructed in such that color component images of R (red), G (green) and B (blue) of an original image respectively displayed on a plurality of CRTs provided to respective colors of R, G and B are focused onto a plurality of spatial light modulators for amplifying intensities of the color component images, and a single 3-color image of composite light of R, G and B obtained through the spatial light modulators and a cross-type 3-color composition member, is projected onto a screen as a magnified color composite image by a projecting lens system having only one optical axis.

2. Description of the Related Arts

Recently, diversity and high quality of image information have been advanced, so that there are increased such high quality image data as typically presented in HDTV (high-definition TV) broadcasting system and SVGA (Super Video Graphic Array) of a computer graphic system. In this connection, there are proposed many kinds of video projectors for displaying the high quality image data with a large magnification.

In these video projectors, there is one in which an image displayed on a CRT (cathode ray tube) is directly projected onto a screen by being optically magnified, and another one in which a small liquid crystal panel is driven as a light valve and the image displayed on the light valve is projected onto a screen by being optically magnified.

In these methods, it requires a high brightness for the image to be displayed on the CRT or on the liquid crystal panel to project an adequately bright image on the screen.

Specifically, in the case of employing the CRT, it may be possible to obtain a bright image by increasing the electron beam output of the CRT, however, it is impossible to obtain a high resolution image at the same time due to the inherent limitation of the CRT.

On the other hand, in the case of employing the liquid crystal panel, it is well known that the brightness of the image displayed on the panel depends on an amount of a light passing through the liquid crystal panel caused by light emitted from a light source placed in backside thereof. Therefore, when an area of a window or a picture element is made larger so as to increase the amount of the light passing through the liquid crystal panel, the numbers of the picture elements of the liquid crystal panel are obliged to be more decreased, this degrades the resolution of the image thereon. Thus, it is impossible to obtain the image having both the high resolution and the high brightness in using the above methods.

Therefore, there is proposed a video projector capable of projecting an image having both the high resolution and the high brightness on the screen in such a manner that the image displayed on the CRT or the liquid crystal panel is focused onto a spatial light modulator (trade name, ILA: Image Light Amplifier) having a function of a light amplification as shown in "Electronics Life" September 1993 (page 117–121) issue.

Figure 1:
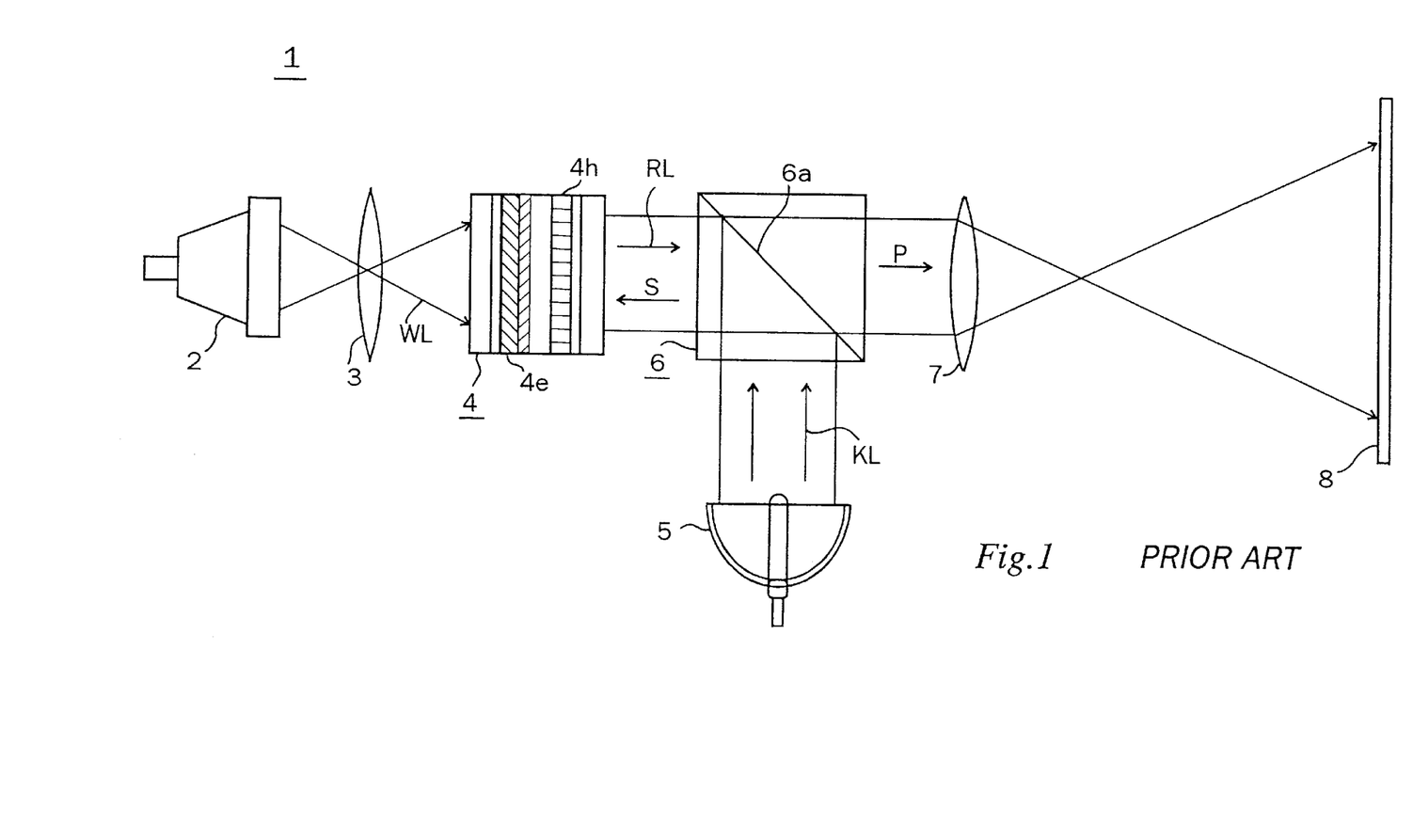
FIG. 1 is a schematic sectional side view for explaining the principle of the video projector in the prior art.
Figure 2:
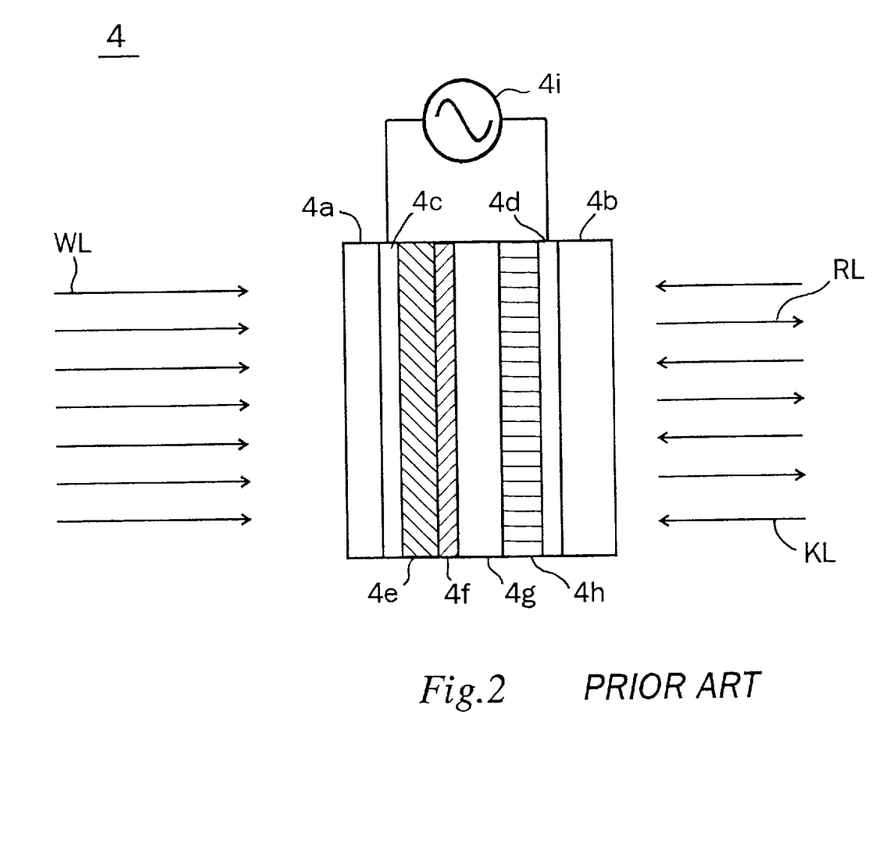
FIG. 2 is a sectional side view showing a spatial light modulator used in FIG. 1.
Figure 3:
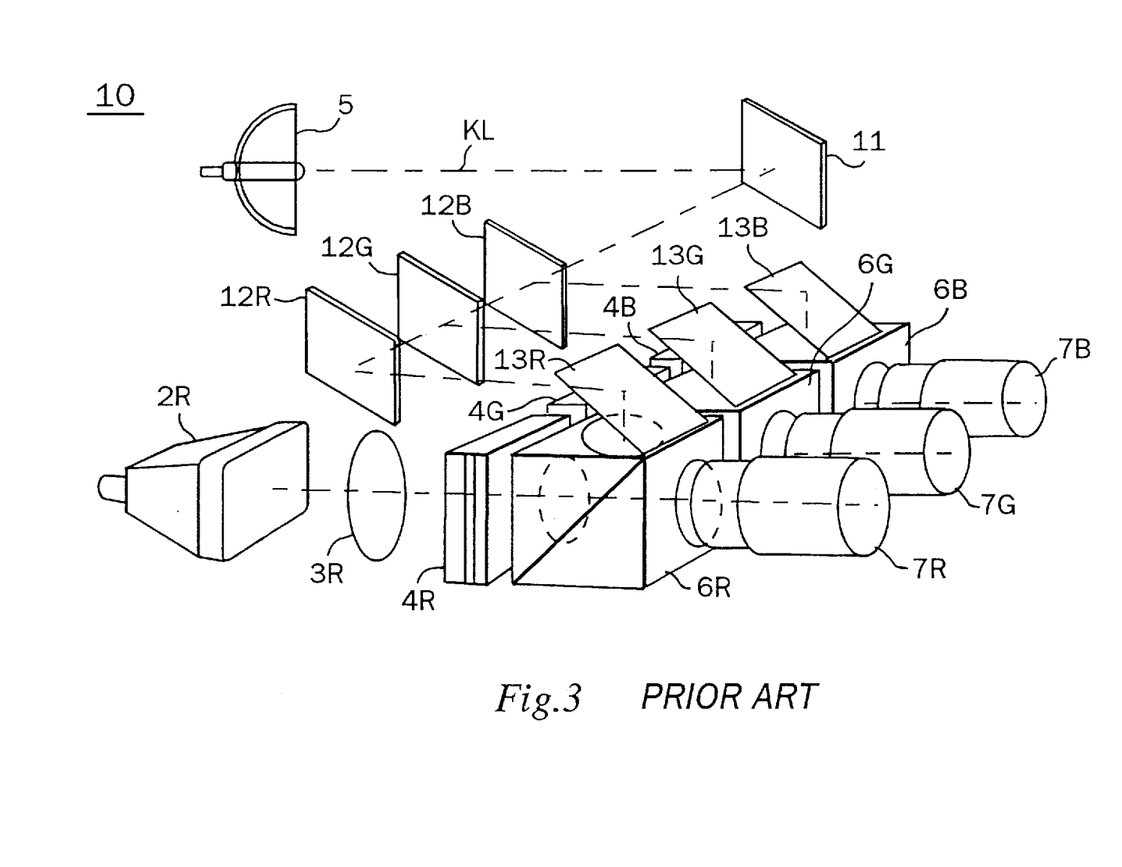
FIG. 3 is a perspective view showing a color video projector employing a plurality of CRTs and a plurality of spatial light modulators each provided for R, G and B.

FIG. 1 is a schematic sectional side view for explaining the principle of the video projector in the prior art;

FIG. 2 is a sectional side view showing a spatial light modulator used in FIG. 1; and FIG. 3 is a perspective view showing a color video projector employing a plurality of CRTs and a plurality of spatial light modulators each provided for R, G and B.

Referring to FIG. 1, the projector 1 in the prior art comprises a CRT 2, a writing lens 3, a spatial light modulator 4, a reading light source 5, a polarization beam splitter 6, a projection lens 7, and a screen 8, wherein the projector 1 is constructed in such a manner that an image displayed on the CRT 2 is focused onto the spatial light modulator 4 by the writing lens 3, and the image is projected in a large magnification onto the screen 8 by the projection lens 7 through the spatial light modulator 4 having a function as an image light amplifier. A liquid crystal panel (not shown) may be used instead of the CRT 2.

Before giving an operational explanation of the video projector 1, a description is given of the construction and operation of the spatial light modulator 4 in reference with FIG. 2.

As mentioned in the foregoing, the spatial light modulator 4 has a function as an image light amplifier for amplifying a feeble writing light (image picture), of which the amplification is about millionfold.

The spatial light modulator 4 is composed of a several thin films interposed between a pair of glass substrate 4a, 4b, without undergoing a minute dividing process for the picture elements.

Specifically, the spatial light modulator 4 comprises a glass substrate 4a, a transparent electrode 4c, a photo-conductive layer 4e, a light shielding layer 4f, dielectric mirror 4g, a liquid crystal layer 4h, a transparent electrode 4d and a glass substrate 4b disposed in this order, wherein an alternating voltage (AC) of 10 V is applied across the transparent electrodes 4c, 4d from an alternative bias power source 4i.

Accordingly, when a feeble writing light WL of an information image irradiates the photoconductive layer 4e through the glass substrate 4a of the special light modulator 4, an impedance distribution of the photo-conductive layer 4e changes corresponding to the intensity distribution of the writing light WL. Thus, the voltage applied across the transparent electrodes 4c, 4d is controlled accordingly with the change of the impedance distribution of the photoconductive layer 4e. On the other hand, when a light KL from the reading light source 5 irradiates on the spatial light modulator 4 through the glass substrate 4b, the light KL passing through the liquid crystal layer 4h is reflected by the dielectric mirror 4g and proceeds in the reverse direction as a reading light RL.

During the light KL is passing through the liquid crystal layer 4h and is reflected by the dielectric mirror 4g as a reading light RL, the reading light RL undergoes an optical modulation in accordance with the polarization state of the liquid crystal layer 4h which is changed corresponding to the change of the intensity distribution of the writing light WL.

Accordingly, the spatial light modulator 1 has a feature that the writing light and reading light can be processed independently each other without any interaction to each other due to the light shielding layer 4f for optically shielding the light KL from invading the photoconductive layer 4e, though the reading light RL is modulated in accordance with the intensity of the light distribution of the writing light WL.

At that time, a feeble light can be used for the writing light WL because of employing an amorphous silicon material having a high sensitivity as the photoconductive layer 4e. Thus, when the CRT is employed, the amount of the electron beam current of the CRT can be reduced, and when the liquid crystal panel is employed, the driving current of the liquid crystal panel can be made at the minimum. These enable to write a high resolution image thereon.

Referring back to FIG. 1, upon operating the video projector 1 equipped with the above spatial light modulator 4, the image displayed on the CRT 2 is focused onto the photoconductive layer 4e of the spatial light modulator 4 by the writing lens 3 through the glass substrate 4a.

On the other hand, when the light KL from the reading light source 5 impinges on the polarization beam splitter 6, an S-polarized component light of the light KL is selectively reflected at a right angle and is incident on the spatial light modulator 4 through the glass substrate 4b and is reflected and outputted as the reading light RL being modulated by the liquid crystal layer 4h in accordance with the modulation state caused by the writing light WL.

When the reading light RL outputted from the spatial light modulator 4 impinges on the polarization beam splitter 6, only a, P-polarized component of the reading light RL passes through the beam splitter 6 and is outputted as an image light corresponding to the modulation state of the liquid crystal layer 4h, and is projected onto the screen 8 as a magnified image by the projecting lens 7.

Incidentally, the polarized beam splitter 6 is formed in a cube by using glass materials, and a dielectric multiple layer 6a is formed along a diagonal line of the cube in the glass materials.

Next, a description is given of a color video projector 10 in the prior art equipped with a plurality of CRTs and a plurality of spatial light modulators according to the principle of the above video projector 1 in reference with FIG. 3, wherein like components seen in the video projector 1 are shown by corresponding reference characters, and components exclusive to R, G and B are respectively shown by adding auxiliary corresponding reference characters, R, G and B.

In the color video projector 10 shown in FIG. 3, color images of R, G and B each displayed on the exclusive CRTs 2R, 2G, 2B (here only 2R is shown) for R, G and B colors are respectively focused onto the spatial light modulators 4R, 4G and 4B by the writing lenses 3R, 3G and 3B.

On the other hand, after the light KL emitted from the light source 5 is reflected by the mirror 11, the light KL is divided into three lights in accordance with B, G, R wavelength ranges in this order by dichroic filters 12B, 12G, 12R. The separated lights are incident on polarization beam splitters 6B, 6G, 6R reflected by mirrors 13B, 13G, 13R, respectively. The reading lights of B, G and R modulated by the spatial light modulators 4B, 4G, 4R are outputted through the polarization beam splitter 6B, 6G, 6R, and are projected onto a screen (not shown) as a composite color image by a plurality of projection lenses 7R, 7G, 7B.

As mentioned in the foregoing, it is difficult to obtain an image having both high resolution and high brightness by employing the method where an image displayed on the CRT is directly projected optically onto the screen by being magnified or the method where an image displayed on the liquid crystal panel is directly projected optically on the screen by driving the small type liquid crystal panel as a light valve.

On the other hand, when employing the method as shown in FIG. 3, wherein the reading lights of R, G, B are projected by the plurality of projecting lenses to compose a single composite color image on the screen. Thus, it will be understood that it is inconvenient for users to adjust the reading light of R, G, B to converge for producing a single composite image on the screen by projecting them actually. Furthermore, this may require a person who is skilled in adjusting the reading lights of R, G, B.

Further, it is difficult to employ zoom lenses in the method because the three projection lenses 7R, 7G, 7B are used. When fixed focusing lenses are used as the projection lenses, a length between the screen and the lenses is limited, thus the space or place for projecting the images on the screen is also limited.

Further, there is a problem of a high production cost because the video projector 10 employs three projection lenses 7R, 7G, 7 B.

SUMMARY OF THE INVENTION

Accordingly, a general object of the present invention is to provide a video projector in which the above disadvantages have been eliminated.

A more specific object of the present invention is to provide a video projector comprising a projection lens system having only one optical axis for projecting a 3-color composite light on a screen and an optical system capable of synthesizing the 3-color composite light from 3-color component images of R, G and B of an original image which are respectively displayed on a plurality of display means.

Another and more specific object of the present invention is to provide a video projector comprising a plurality of image displaying means corresponding to R, G and B colors for displaying R, G and B color images of an original image, a plurality of spatial light modulators being provided corresponding to the plurality of image displaying means, each of the spatial light modulators having a writing side onto which one of the R, G and B color images is focused and a reading side from which image information is read out, and a reading light source from which a light is emitted and is divided into three color lights of R, G and B so as to be inputted in the reading side of the respective spatial light modulators, wherein the R, G and B color images displayed on the plurality of image displaying means are respectively focused onto the writing sides of the spatial light modulators, and a plurality of reading lights of R, B and G are outputted from the reading sides of the spatial light modulators by being irradiated by the three color lights of R, G and B so as to be projected as a single composite color image onto a screen by projecting means, the video projector comprising, a 3-color separation member for dividing the light from the reading light source into the three color lights of R, G and B, the 3-color separation member having an input surface for introducing the light from the reading light source therein and a plurality of output surfaces for outputting the three color lights of R, G and B to the respective spatial light modulators, a 3-color composition member for synthesizing a single 3-color composite light image from the three color reading lights of R, G and B which have been modulated and reflected by the plurality of spatial light modulators, the 3-color composition member having a plurality of input surfaces for introducing the plurality of three color reading lights and an output surface from which the single 3-color composite light image is outputted, and a projecting lens system having only one optical axis for projecting the single 3-color composite light image on a screen, wherein the 3-color separation member and the 3-color composition member are disposed in a stacked manner as such that both the input surface of the 3-color separation member and the output surface of the 3-color composition member are disposed to face approximately in a first predetermined direction, and the plurality of output surfaces of the 3-color separation member and the plurality of input surfaces of the 3-color composition member are respectively disposed to face in the same direction with respect to each color of R, G and B other than the first predetermined direction.

Other objects and further features of the present invention will be apparent from the following detailed description.

DETAILED DESCRIPTION OF THE PREFERRED EMBODIMENTS

A description is now given in detail of first and second embodiments of the video projector of the present invention with reference to FIGS. 4 through 12.

[A first embodiment]

Figure 4:
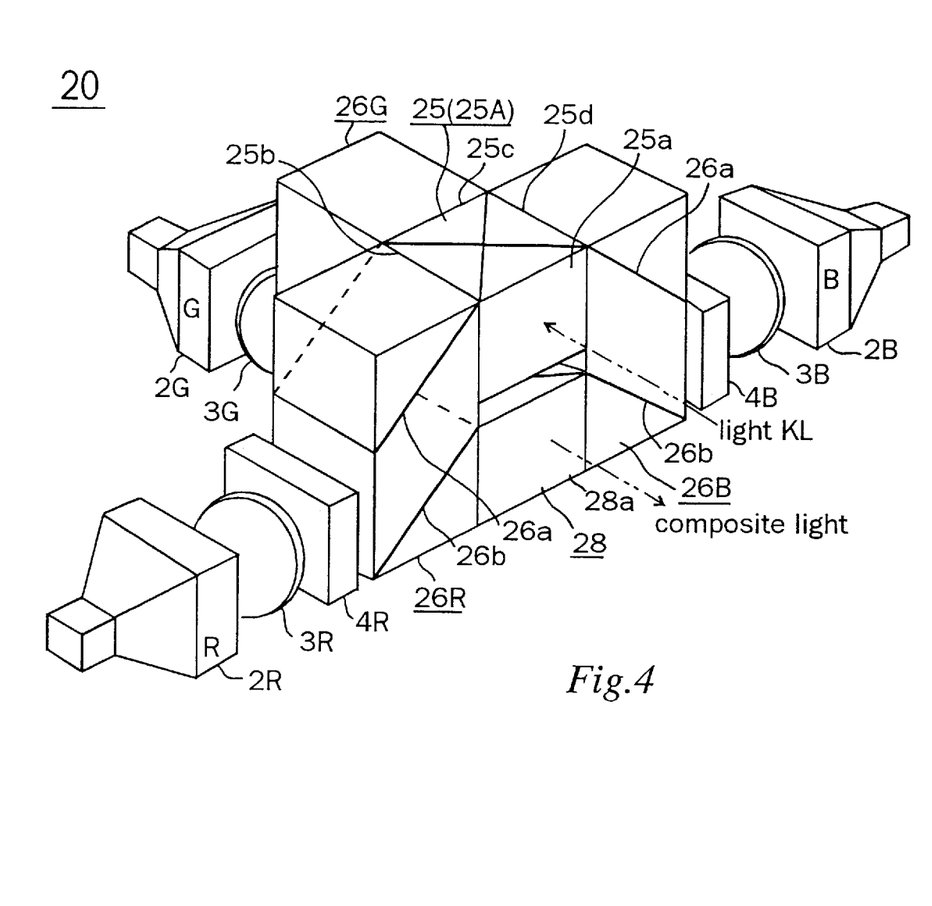
FIG. 4 is a perspective view schematically showing a first embodiment of the video projector of the present invention.
Figure 5:
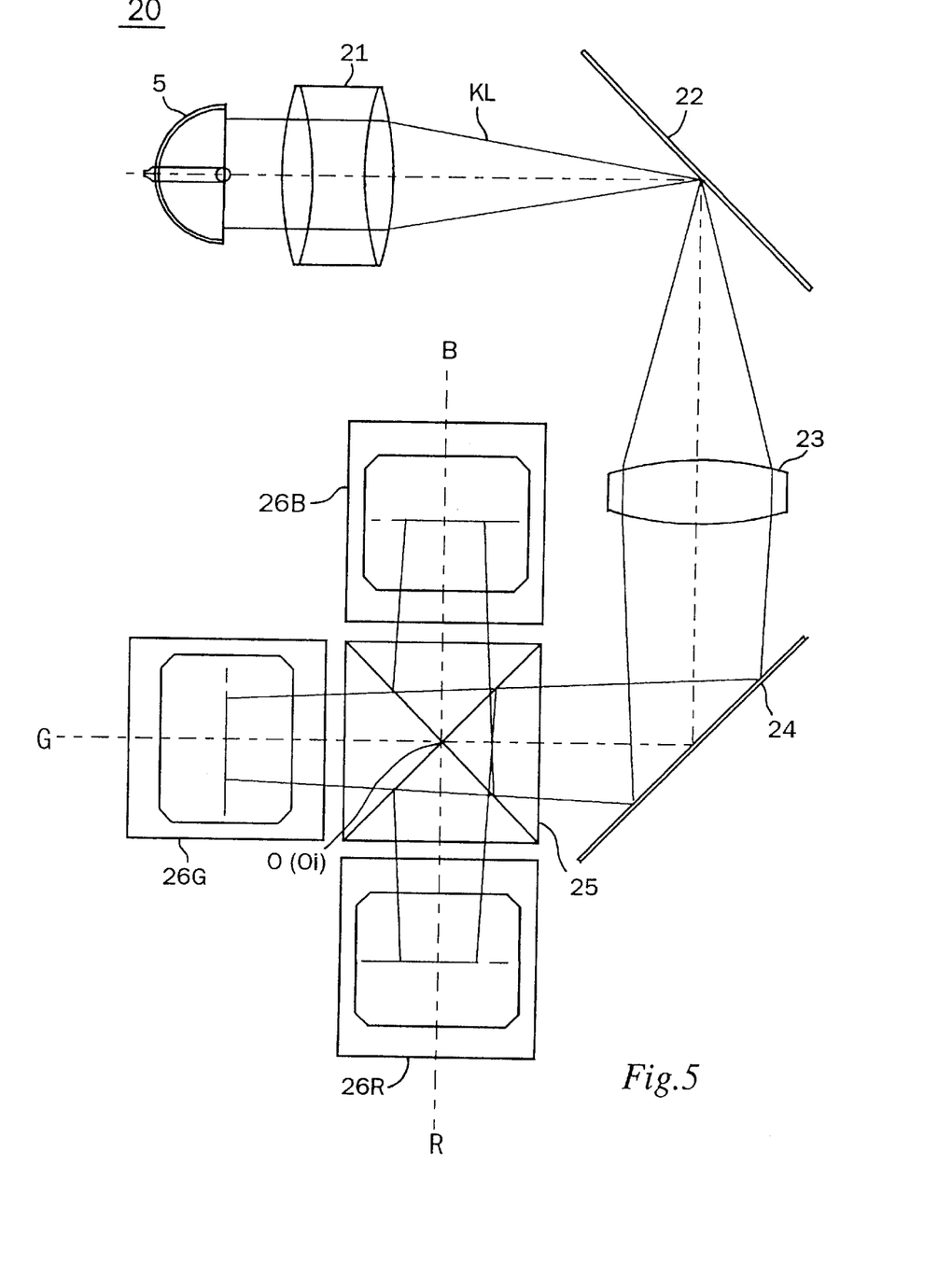
FIG. 5 is a plan view showing of the video projector in the first embodiment in which a reading light source is disposed in an upper level.
Figure 6:
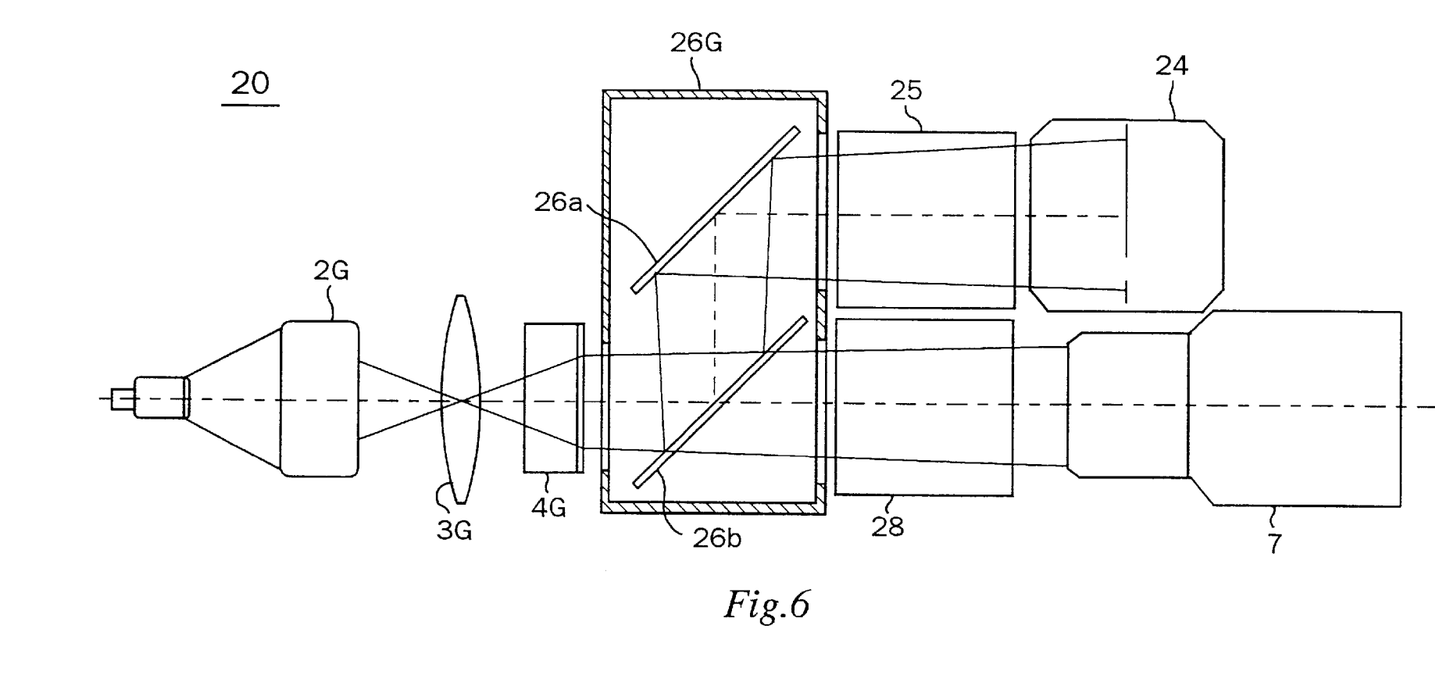
FIG. 6 is a sectional side view showing elements in the reading light source side disposed in the upper level and CRTs (only green CRT is shown) disposed in a lower level in the first embodiment.
Figure 7:
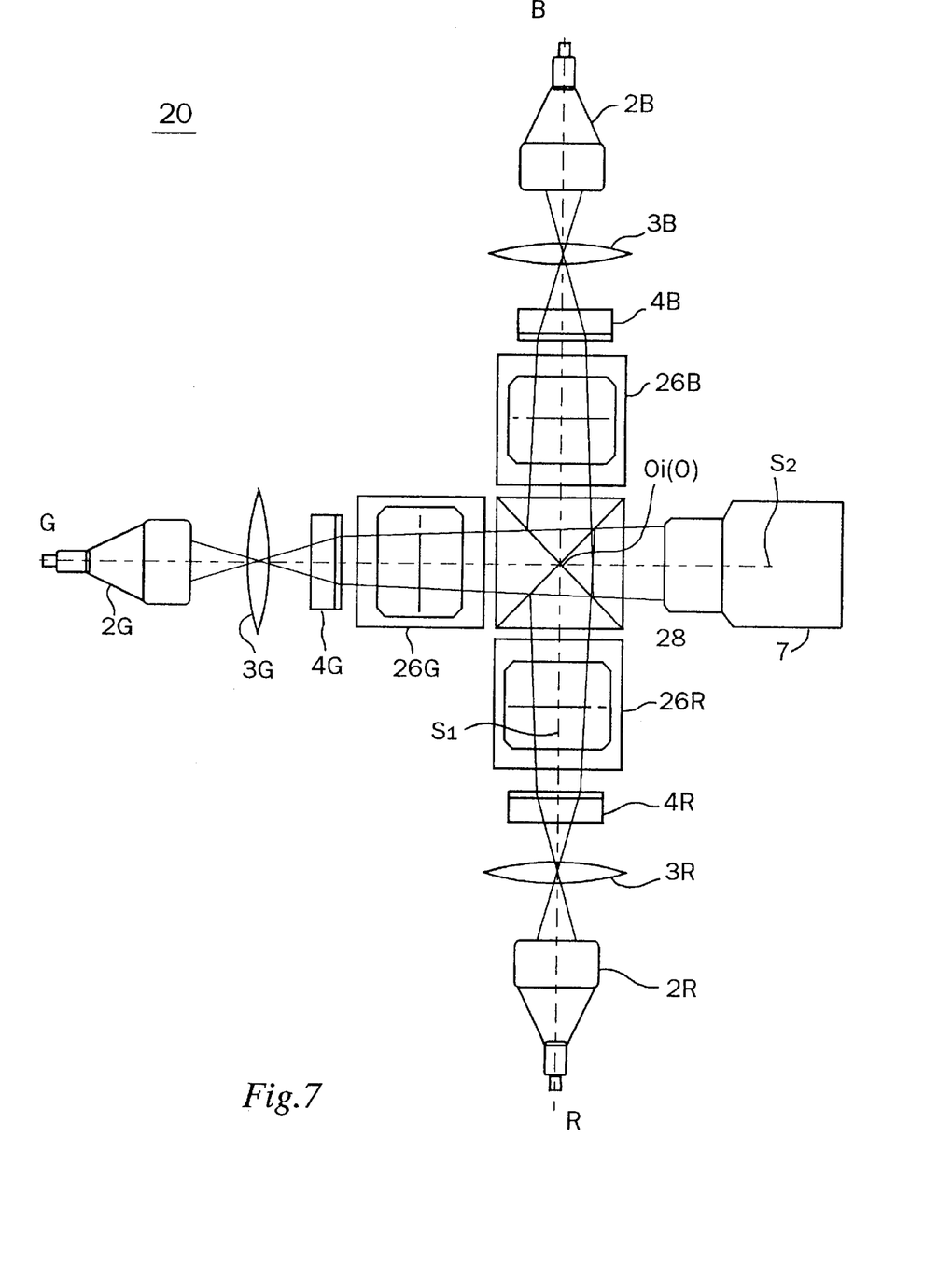
FIG. 7 is a plan view showing a plurality of CRTs disposed in the lower level in the first embodiment.
Figure 8:
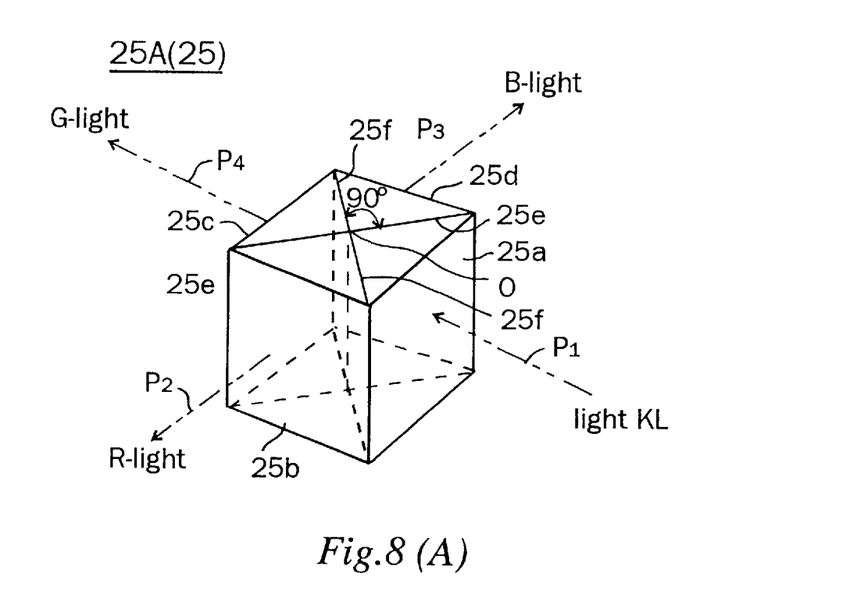
FIG. 8(A) is a perspective view showing a cross-type 3-color separation member shown in FIG. 4 in the first embodiment.
FIG. 8(B) is a perspective view showing another cross-type 3-color separation member shown in FIG. 4 in the first embodiment.
Figure 9A:
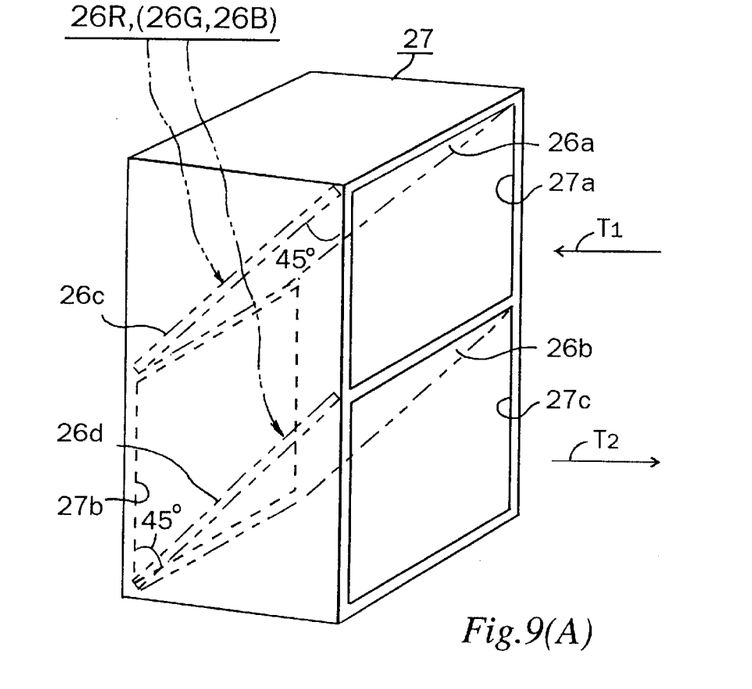
FIG. 9(A) is a perspective view showing a polarization beam splitter block shown in FIG. 4 in the first embodiment.
Figure 9B:
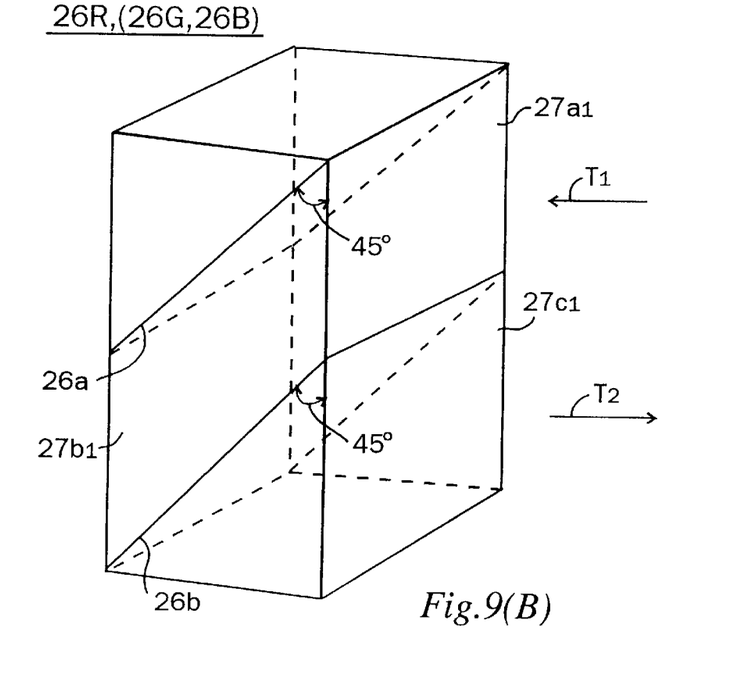
FIG. 9(B) is a perspective view showing another polarization beam splitter block shown in FIG. 4 in the first embodiment.
Figure 10A:
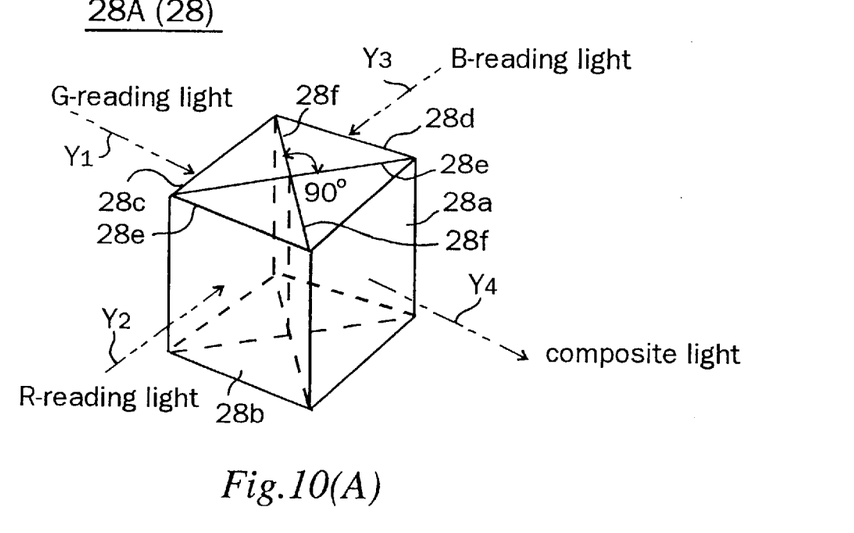
FIG. 10(A) a perspective view of a cross-type 3-color composition member shown in FIG. 4(A) in the first embodiment.
Figure 10B:
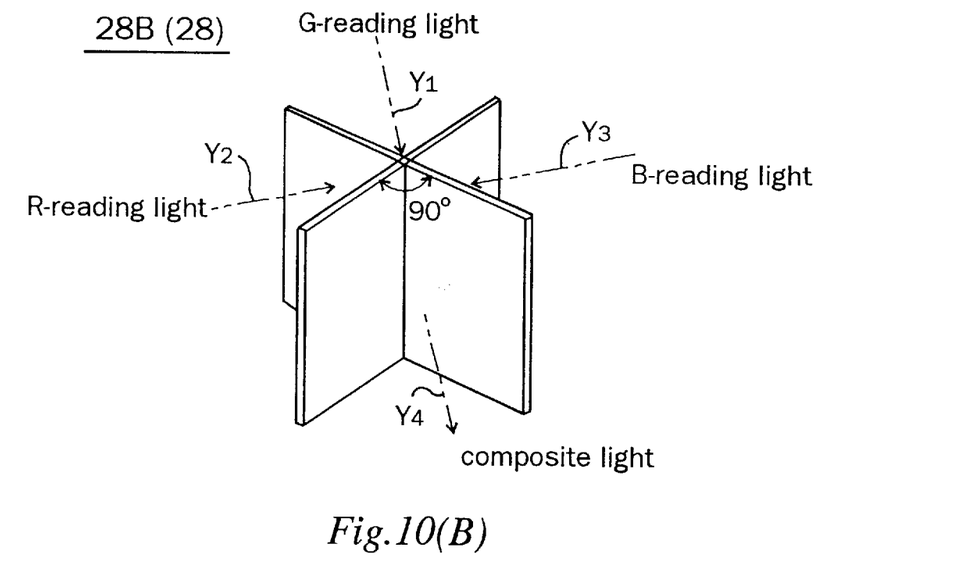
FIG. 10(B) a perspective view of another cross-type 3-color composition member shown in FIG. 4(B) in the first embodiment.

FIG. 4 is a perspective view schematically showing a first embodiment of the video projector of the present invention;

FIG. 5 is a plan view showing a reading light source disposed in an upper level in the first embodiment;

FIG. 6 is a sectional side view showing the reading light source side disposed in the upper level and CRTs (only 2G is shown) side disposed in a lower level in the first embodiment;

FIG. 7 is a plan view showing a plurality of CRTs disposed in the lower level in the first embodiment;

FIG. 8(A) is a perspective view showing a cross-type 3-color separation member shown in FIG. 4 in the first embodiment;

FIG. 8(B) is a perspective view showing another cross-type 3-color separation member shown in FIG. 4 in the first embodiment;

FIG. 9(A) is a perspective view showing a polarization beam splitter block shown in FIG. 4 in the first embodiment;

FIG. 9(B) is a perspective view showing another polarization beam splitter block shown in FIG. 4 in the first embodiment;

FIG. 10(A) a perspective view of a cross-type 3-color composition member shown in FIG. 4(A) in the first embodiment; and FIG. 10(B) a perspective view of another cross-type 3-color composition member shown in FIG. 4(B) in the first embodiment.

For convenience, like components seen in the video projectors in the prior arts are shown in the embodiments of the present invention by corresponding reference characters, and components exclusive to R, G, B in the present invention are respectively shown by auxiliary reference characters followed by R, G, B correspondingly.

In a video projector 20 of the first embodiment of the present invention shown in FIGS. 4, 5, and 6, three color images displayed on exclusive CRTs 2R, 2B and 2G which are exclusive to R, B and G colors respectively are focused onto writing sides of spatial light modulators 4R, 4B and 4G by a plurality of writing lenses 3R, 3B and 3G, respectively. On the other hand, after a beam of light (referred to as a light hereinafter) from the reading light source 5 has been divided into three color lights of R, G and B by a cross-type 3-color separation member 25, the divided three color lights are respectively incident on the reading sides of spatial light modulators 4R, 4B and 4G through a plurality of polarization beam splitter blocks 26R, 26G and 26B. Each of the beam splitter blocks 26R, 26G and 26B is constructed as such that a pair of dielectric multiple layers 26a, 26b are formed parallel to each other in upper and lower positions therein. Then, from a plurality of reading lights of R, G and B reflected and outputted from the reading sides of the spatial light modulators 4R, 4G and 4B, a single composite image light is synthesized by a cross-type 3-color composition member 28, and the single composite image light is projected onto a screen as a magnified composite color image by a projection lens 7.

As shown in FIGS. 4 and 7, the CRTs 2R and 2B are disposed along a first line S1 in a lower level of the video projector so as to face each other, and the CRT 2G is disposed along a second line S2 perpendicularly intersecting the first line S1 in the lower level. As seen from FIG. 7, the above first and second lines S1, S2 make a "CROSS" having an intersectional point "Oi" on a same plan, thus, the CRTs 2R, 2G, 2B are disposed in each of three directions of the cross in the lower level. As mentioned hereinafter, on the intersectional point "Oi" of the cross, the cross-type 3-color separation member 25 and the CROSS type 3-color composition member 28 are coaxially stacked with each other in upper and lower levels, respectively.

A plurality of writing lenses 3R, 3G, 3B and a plurality of spatial light modulators 4R, 4G, 4B are provided to the 3-colors in accordance with the plurality of the CRTs 2R, 2G, 2B. Each of the images displayed on the CRTs 2R, 2G, 2B is incident on the glass substrate 4a (FIG. 2) of each of the spatial light modulators 4R, 4G, 4B and is focused onto the photoconductive layer 4e (FIG. 2) thereof. The spatial light modulator 4 explained in the prior art is employed as the above mentioned spatial light modulators 4R, 4G, 4B for every color, thus for the operations of the spatial light modulators 4R, 4G and 4B, the reference thereof should be made to the description of the spatial light modulator 4 in the prior art.

In this connection, R and B light channels or R and B optical paths with respect to the CRTs 2R, 2B are disposed so as to perpendicularly intersect a G light channel or a G optical path with respect to the CRT 2G, and constituting optical members in relation to optical paths for introducing reading lights to a projecting lens 7 are provided in a lower level than those of optical paths for the light KL emitted from the reading light source 5.

On the other hand, as shown in FIGS. 5 and 6, in the light source 5 side which is in the upper level, after the light KL emitted from the light source 5 and passing through a condenser lens 21 has been reflected at a right angle by a mirror 22, the light KL passing through a lens 23 is further reflected at a right angle by a mirror 24 and is incident on the cross-type 3-color separation member 25 placed at the intersecting point "Oi" of the CROSS in the upper level.

Next, a description is given of the construction of the cross-type 3-color separation member (referred to as the separation member hereinafter) 25 (25A, or 25B) in reference with FIGS. 8(A) and 8(B).

In the present invention, either a cross-type prism filter 25A shown in FIG. 8(A) or a cross-type plate filter 25B shown in FIG. 8(B) is employed as the separation member 25.

Referring to FIG. 8(A), the separation member 25A composed of the cross-type prism filter 25A is constructed in a rectangular solid by cementing four heat-proof glass blocks each having an isosceles triangle shape with a vertex of a right angle in section by using transparent bond, and an R dichroic layer 25e for reflecting a light within a red color wavelength range and a B dichroic layer 25f for reflecting a light within a blue color wavelength range are respectively formed on interfacing surfaces or the connected surfaces of the four heat-proof glass blocks. Thus, this separation member 25A has an excellent 3-color separation characteristic because a cross point "O" made by the four vertexes thereof has no gap, though the separation member 25A has a tendency of high cost.

Upon operation of the separation member 25A, the light KL is incident on a surface 25a of the separation member 25A from the light source 5 in a direction of an arrow P1, and is color divided into two different directions in a left-hand side and a right-hand side with respect to a line passing through the cross point "O" in the direction of the arrow P1.

At first, when one part of the light KL incident on a right half of the surface 25a with respect to the line passing the cross point "O" in the direction of the arrow P1 impinges on the R dichroic layer 25e, the one part of the light KL is divided into two lights, i.e., a light of the red color wavelength range which is reflected in a direction of an arrow P2 at a right angle to P1 by the R dichroic layer 25e and is outputted as the R light from a surface 25b passing through the B dichroic layer 25f, and another light passing straight through the R dichroic layer 25e. The another light passing through the R dichroic layer 25e is further divided into two lights, i.e., a light of the blue color wavelength range which is reflected in a direction of an arrow P3 at a right angle to P1 by the B dichroic layer 25f and is outputted as the B light from a surface 25d thereof, and another light of green color wave length range which passes the B dichroic layer 25f and is outputted in a direction of an arrow P4 as the G light from a surface 25c thereof.

Next, when another part of the light KL incident on a left half of the surface 25a with respect to the above line impinges on the B dichroic layer 25f, this part of the light KL is divided into two lights, i.e., a light of the blue color wavelength range which is reflected in the direction of the arrow P3 at a right angle to P1 by the B dichroic layer 25f and is outputted as the B light from a surface 25d passing through the R dichroic layer 25e, and another light passing through the B dichroic layer 25f. The another light passing through the B dichroic layer 25f is further divided into two lights, i.e., a light of the red color wavelength range which is reflected in the direction of the arrow P2 at a right angle to P1 by the R dichroic layer 25e and is outputted as the R light from the surface 25b thereof, and another light of green color wave length range which passes straight through the R dichroic layer 25e and is outputted in the direction of the arrow P4 as the G light from a surface 25c thereof.

As seen from the above description, in the operation of the separation member 25A, the separation of the red color wavelength light is performed by reflecting the light with the R dichroic layer 25e and by transmitting the light through the B dichroic layer 25f, and the separation of the blue color wavelength light is performed by reflecting the light with the B dichroic layer 25f and by transmitting the light through the R dichroic layer 25e, and the separation of the green color wavelength light is performed by transmitting the light through both the R and B dichroic layers 25e and 25f.

On the other hand, the separation member 25B composed of the cross-type plate filter shown in FIG. 8(B), is constructed in a cross state by cementing four heat-proof glass plates or resin plates on which the R and B dichroic layers (not shown) are formed in the same manner as mentioned in the foregoing.

Upon operation, the light KL from the reading light source 5 irradiates the separation member 25(B) in a direction of the arrow "P1" so as to divide the light KL into the three colors of R, G and B in the same manner as mentioned in the foregoing.

This separation member 25B has an advantage of a low cost because of employment of the glass plates or resin plates, though it may be inferior to the former separation member 25A in the 3-color separation characteristics due to a gap formed at a joint of the four plates.

In this invention, one of the separation members 25A and 25B is optionally selected depending on applications, taking account of the cost performance and the separation quality.

Referring to FIG. 4 again, a plurality of polarization beam splitter blocks 26R, 26G, 26B are provided in adjacent to the separation member 25 so as to face the surfaces 25b, 25c, 25d of the separation member 25 (25A), respectively.

Next, a description is given of the plurality of polarization beam splitter blocks 26R, 26G, 26B each having the same construction. Thus, the description is given to the polarization beam splitter block (referred to as beam splitter block hereinafter) 26R, for example, in reference with FIG. 9(A).

The beam splitter block 26R is constructed as such that a pair of glass plates 26c, 26d respectively coated with dielectric multiple layers 26a, 26b is disposed parallel at an upper level and a lower level in a sealed chamber 27 equipped with three transparent windows 27a, 27b, 27c facing in input and output directions T1 and T2 of the light, and transparent liquid having a refractive index approximately as large as those of glass members is filled in the sealed chamber 27 so as to stabilize the polarized beams by preventing the birefringence of the light inputted. Incidentally, the surfaces of the pair of glass plates 26c, 26d are inclined to input and output surfaces of the transparent windows 27a, 27b, 27c, by 45°, respectively.

The beam splitter block 26R has a function of dividing an indefinite polarized light incident on one surface of a transparent windows of the beam splitter block 26R, into an S-polarized light and a P-polarized light without absorbing the indefinite polarized light. The beam splitter block 26R of the present invention has a high separating accuracy because of provision of the pair of the dielectric multiple layers 26a, 26b on the pair of the glass plates 26c, 26d in the upper and lower positions therein, respectively. Thus, it is able to obtain an output light having a high contrast ratio because it is possible to provide the S-polarized light having high purity onto the spatial light modulator 4R, for instance.

Another example of the beam splitter block 26R used in the present invention is shown in FIG. 9(B), wherein three glass blocks having flat bonding surfaces parallel to each other are connected by using transparent bond, and the dielectric multiple layers 26a, 26b are formed on the interfacing surfaces or bonding surfaces. Incidentally, the dielectric multiple layers 26a, 26b are inclined to input and output surfaces 27a1, 27b1, 27c1 by 45°, respectively.

As mentioned in the foregoing, the beam splitter blocks 26R, 26G, 26B have the same construction, thus, an operation of the beam splitter block 26R is explained as an example.

The R light separated by the separation member 25 is incident on the transparent window 27a provided at an upper level in a front side of the beam splitter block 26R facing in a direction of an arrow T1, and impinges on the dielectric mirror 26a. At that time, an S-polarized component light of the incident R light is only reflected at a right angle by the dielectric multiple layer 26a disposed in the upper level, and further reflected at a right angle by the dielectric multiple layer 26b disposed in the lower level. Thus, the S-polarized light is outputted from the transparent window 27b provided at the lower level in the rear side of the beam splitter block 26R by being displaced of the optical axis thereof.

In this connection, the transparent window 27b at the lower level in the rear side thereof faces the another glass substrate 4b (shown in FIG. 2) of the spatial light modulator 4R. Thus, the S-polarized component outputted from the transparent window 27b is incident on the another glass substrate 4b. After passing through the liquid crystal layer 4h, the S-polarized light is reflected by the dielectric mirror 4g and is outputted as the reading light through the liquid crystal layer 4h again. During passing through the liquid crystal layer 4h, the S-polarized light is modulated in response to the change of the polarizing state of the liquid crystal layer 4h caused by the writing light of R (the image of R). Thus, the S-polarized light is outputted as the reading light of R carrying the image of R caused by the sectional intensity distribution of the writing light of R. The reading light of R is incident on the dielectric multiple layer 26b again. Since a P-polarized component of the reading light of R is allowed only to pass through the dielectric multiple layer 26b, the P-polarized light is outputted from the transparent window 27c provided at the lower level in the front side of the beam splitter block 26R. Incidentally, the reading light of R of the P-polarized light is inputted onto a cross-type 3-color composition member 28 as mentioned hereinafter.

The operation of the beam splitter blocks 26G, 26B follow the example of the beam splitter block 26R, i.e., in the reading lights of G, B outputted from the spatial light modulator 4G, 4B, the P-polarized components thereof are only inputted onto the cross-type 3-color composition member 28.

Next, a description is given of the cross-type 3-color composition member (referred to as the composition member) 28 in reference with FIGS. 10(A) and 10(B).

The composition member 28 has the same construction as that of the separation member 25 (25A, 25B) having the cross point "O" of the cross shown in FIGS. (8A), (8B). The composition member 28 is coaxially disposed under the separation member 25 with respect to a line passing through the both cross points "O" of the separation and composition members 25, 28 and the intersecting points "Oi" of the CROSS mentioned in the foregoing. Thus, the beam splitter blocks 26R, 26G, 26B mentioned in the foregoing are also disposed in adjacent to the the composition member 28.

In the present invention, either a cross-type prism filter shown in FIG. 10(A) or a cross-type plate filter shown in FIG. 10(B) is used as the composition member 28. In other words, the composition member 28 (28A, or 28B) is composed of four optical blocks as well as the separation member 25 (25A or 25B), and the R dichroic layer 28e and the B dichroic layer 28f are provided in the same manner as mentioned in the foregoing.

Upon operation, from the three color reading lights of R, G, B from the beam splitters 26R, 26G, 26B, a single composite color image light is synthesized by reversing the operation of the separation of the three color lights of R, G, B, in the composition member 28.

Specifically, referring to FIG. 10(A), the reading light of G from the beam splitter block 26G is incident on a surface 28c of the composition member 28A in a direction of an arrow Y1 and is directly outputted in a direction of an arrow Y4 from a surface 28a of the composition member 28A by passing straight through both the R dichroic layer 28e and the B dichroic layer 28f.

On the other hand, the reading lights of R and B from the beam splitter blocks 26R and 26B are respectively incident on surfaces 28b and 28d of the composition member 28A in a direction of an arrow Y2 and a direction of an arrow Y3, as follows.

At first, one part of the reading light of R incident on a left half of the surface 28b positioned in the left-hand side with respect to a line passing through the cross point "O" in the direction of of the arrow Y2 is reflected at a right angle to Y2 by the R dichroic layer 28e and is outputted from the surface 28a passing through the B dichroic layer 28f in the direction of the arrow Y4. Next, another part of the reading light of R incident on a right half of the surface 28b positioned in the right-hand side with respect to the above line passes through the B dichroic layer 28f, and is also outputted from the surface 28a in the direction of the arrow Y4 by being reflected at a right angle to Y2 by the R dichroic layer 28e.

On the other hand, one part of the reading light of B incident on a right half of the surface 28d thereof positioned in the right-hand side with respect to a line passing through the cross point "O" in the direction of the arrow Y3 is reflected at a right angle to Y3 by the B dichroic layer 28f and is outputted in the direction of the arrow Y4 from the surface 28a thereof passing through the R dichroic layer 28e, and another part of the reading light of B incident on a left half of the surface 28d positioned in the left-hand side with respect to the above line, passes through the R dichroic layer 28e, and is also outputted in the direction of the arrow Y4 from the surface 28a by being reflected at a right angle to Y3 by the B dichroic layer 28f.

As mentioned above, after the reading lights of R and B are combined with the reading light of G, the reading lights of R, G, and B are projected as a single 3-color composite image on the screen by a projection lens 7 (FIGS. 6, and 7) disposed in the front of the surface 28a of the composition member 28A, whereby the reading lights of R and B respectively undergo one additional reflection at the dielectric multiple layers 28e and 28f compared with the reading light. For this reason, images of R and B displayed on the CRTs 2R and 2B are preliminarily reversed by a well known means, otherwise the images of R and B are reversed with respect to right and left, compared with the image of G. Incidentally, it is possible to employ a projection lens system having only one optical path instead of the projection lens 7.

Further, when the separation member 25 is stacked on the composition member 28, the surface 25a of the separation member 25, from which the light KL of the reading light source 5 is inputted, and the surface 28a of the composition member 28, from which the composite reading light is outputted, are disposed so as to face in the same direction (i.e., the arrow P1 shown in FIGS. 8(A) and 8(B) or the arrow Y4 shown in FIGS. 10(A) and 10(B)), whereby the surfaces 25b, 25c and 25d thereof, from which the color lights of R, G and B are respectively outputted, and the surfaces 28b, 28c and 28d thereof, from which the reading lights of R, G and B from the spatial light modulators 4R, 4G and 4B are respectively inputted, are respectively disposed to face in the same direction (i.e., the arrow P2 or the arrow Y2, the arrow P3 or the arrow Y3, and the arrow P4 or the arrow Y1) with respect to the same color.

In this invention, one of the composition members 28A and 28B is optionally selected depending on applications, taking account of the cost performance and the composition quality.

Further, even when the video projector 20 is constructed by employing the separation member 25B of the cross-type plate filter to divide the light KL of an indefinite polarized light from the reading light source 5 into the three color lights of R, G, B, taking account of the production cost, it is possible to display a high quality color image with magnification on the screen as long as the composition member 28 A of the cross-type prism having an excellent separation characteristic is employed because the cross point "O" formed by the four vertexes thereof has no gap, as mentioned in the foregoing.

According to the video projector 20 of the first embodiment of the present invention, the plurality of the images displayed on the plurality of the CRTs 2R, 2G and 2B in accordance with colors of R, G and B are respectively focused onto some sides of the spatial light modulators 4R, 4G and 4B. The light KL from the reading light source 5 is divided into three color lights of R, G and B by the separation member 25, and the three color lights of R, G and B separated are respectively inputted to other sides of the spatial light modulators 4R, 4G and 4B. From a plurality of reading lights outputted from the spatial light modulators 4R, 4G and 4B, a single 3-color composite image light is synthesized by the composition member 28. Thus, the video projector 20 has an optical system capable of projecting a 3-color composite image on the screen by using only one projecting lens 7. This contributes not only reduction of manufacturing cost because of less numbers of the projection lenses to be used and simpler structure compared with that of the prior art, but also saving a skilled hand for setting up the video projector 20 because of requiring no adjustment working for the color image composition on the screen. Further, this allows to use the zoom lens, resulting in eliminating the limitation of the space or place upon operation.

[A second embodiment]

Figure 11:
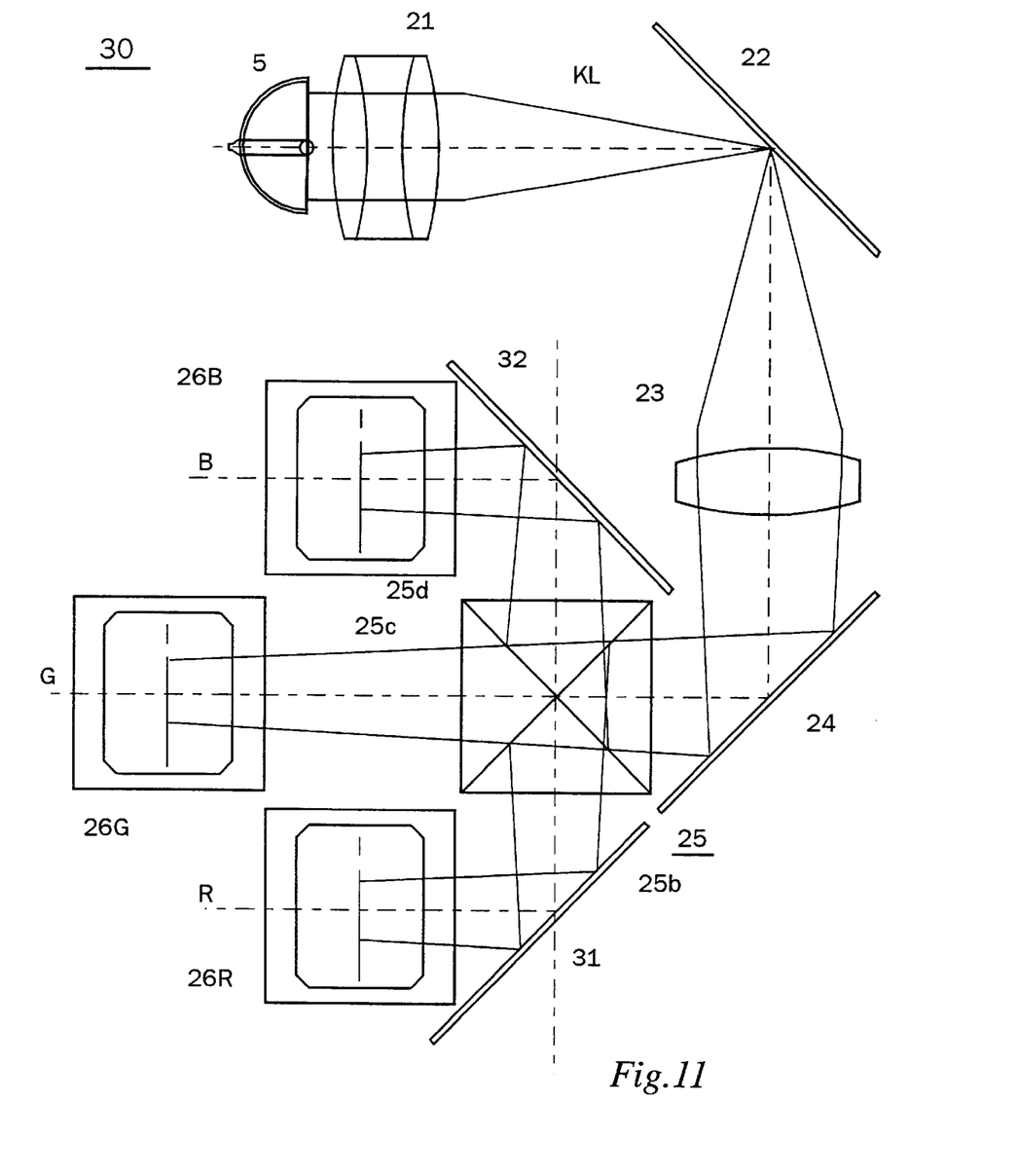
FIG. 11 is a plan view showing a layout of the reading light source in a video projector of a second embodiment in the present invention.
Figure 12:
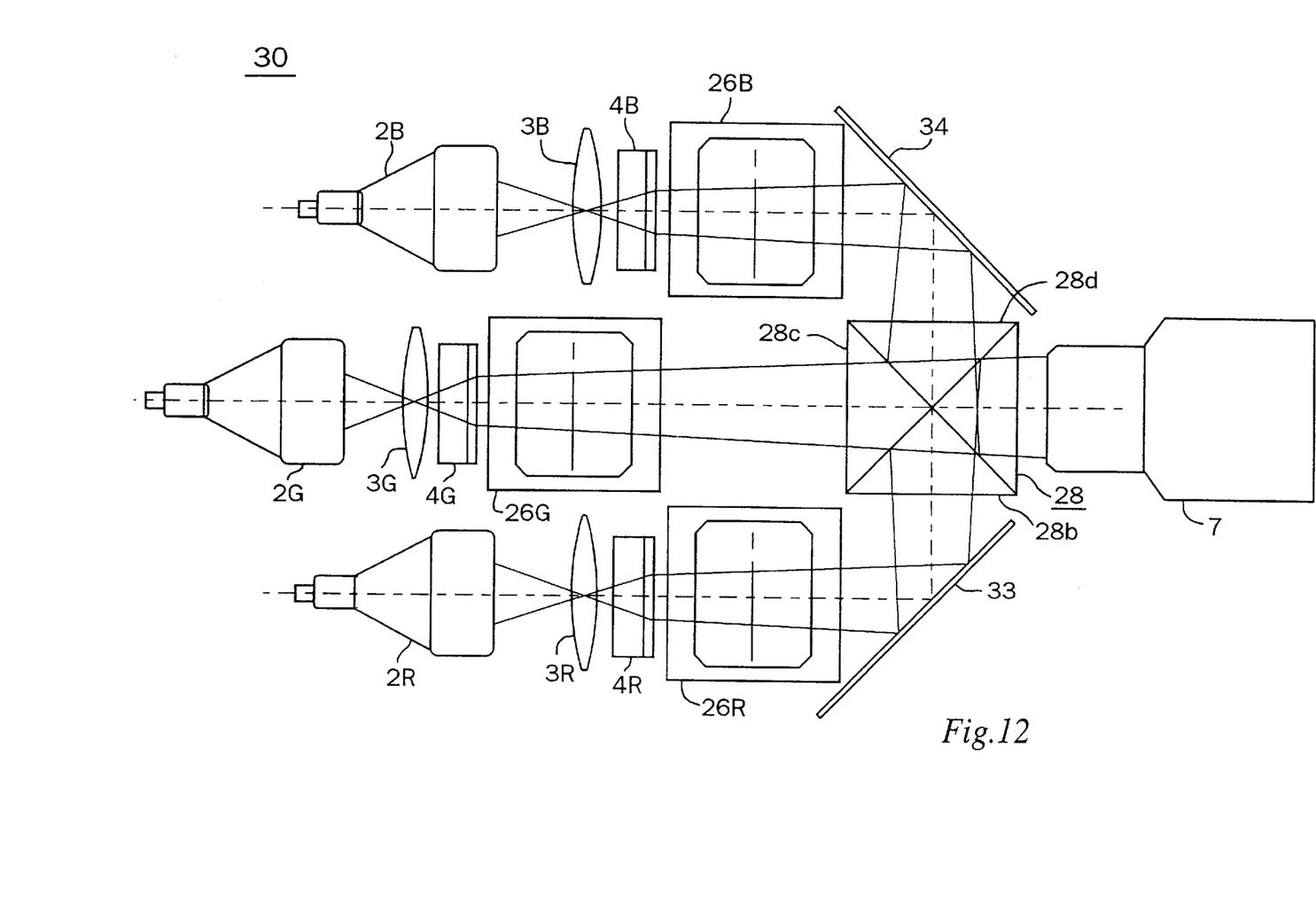
FIG. 12 is a plan view showing a layout of the CRTs in the second embodiment shown in FIG. 11.

FIG. 11 is a plan view showing a layout of the reading light source in a video projector of a second embodiment in the present invention; and FIG. 12 is a plan view showing a layout of the CRTs in the second embodiment shown in FIG. 11;

A description is briefly given of a second embodiment of the video projector of the present invention, in particular, of different points from the video projector 20 of the first embodiment, in reference with FIGS. 11 and 12, wherein like reference characters seen in the prior art and the embodiment 1 designate the same components.

As mentioned in the video projector 20 of the first embodiment, the light paths with respect to the CRT 2R and 2B perpendicularly intersect the light path with respect to the CRT 2G, resulting in occupying a fairly large space in a width direction of the video projector 20 in the first embodiment.

Thus, the video projector 30 of the second embodiment shown in FIGS. 11 and 12 realizes downsizing of thereof in the width direction by taking account of arrangement of the constituting components, keeping the technical concept of the first embodiment.

Referring to FIG. 11, in the video projector 30, after the light KL from the reading light source 5 which is placed in the upper level, has been separated into the three color lights of R, G and B by the separation member 25, the light of R outputted from the surface 25b of the separation member 25 is inputted onto the beam splitter block 26R by being reflected at a right angle by the mirror 31, and the light of G outputted from the surface 25c thereof is directly inputted onto the beam splitter block 26G, and the light of B outputted from the surface 25d thereof is inputted onto the beam splitter block 26B by being reflected at a right angle by the mirror 32.

Thus, the input optical axes of the beam splitter blocks 26R and 26B are respectively made about parallel to the input optical axis of the beam splitter block 26G, this contributes to reduce the occupying space in the direction of width of in the upper level.

As shown in FIG. 12, on the other hand, in the lower level corresponding to the reading light source 5 which is in the upper level, the two reading lights of R and B proceeding through the beam splitter blocks 26R and 26B are respectively inputted onto the surfaces 28b and 28d of the composition member 28 by being reflected at a right angle by the mirrors 33 and 34, and the reading light of G proceeding through the beam splitter block 26G is directly inputted onto the surface 28c of the composition member 28, so that the optical axes of the light paths with respect to both the the CRT 2R and the CRT 2B are respectively parallel to the optical axis of the light path with respect to the CRT 2G, this contributes to reduce the occupying space in the direction of width thereof in the lower level. Thus, it will be understood that the width of the video projector 30 of this embodiment can be reduced.

In this embodiment, the reading lights of R and B undergo one additional reflection compared with those of R and B in the first embodiment because the mirrors 33, 34 are further added. Thus, there is required no image reversing means to preliminarily reverse the images on the CRTs 2R and 2B with respect to right and left.

According to the video projector 30 of the second embodiment of the present invention, it is able to provide the one having the same effectiveness as that of the video projector 20 of the first embodiment, in particular, having a compact size and further requiring no image reversing means.

Incidentally, in the video projector 20, 30 of the first and second embodiments, the separation member 25 (25A or 25B) has the same construction as that of the composition member 28 (28A or 28B), though the function of the separation member 25 is different from that of the composition member 28. Thus, it should be noted that it is possible to provide the reading light source 5 in the lower level, and the projection lens system having only one optical axis provided in the upper level.

Further, it is possible to employ the plurality of liquid crystal panels instead of the CRTs 2R, 2B and 2G on which the images of R, G and B are displayed as shown in the first and second embodiment.

What is claimed is:

1. A video projector comprising a plurality of Cathode Ray Tubes "CRT's" having display surfaces corresponding to R, G and B color images of an original image, a plurality of spatial light modulators being provided corresponding to the plurality of CRT's, each of the spatial light modulators having a writing side onto which one of the R, G and B color images is focused and a reading side from which image information is read out, and a reading light source from which a light is emitted and is divided into three color lights of R, G and B so as to be inputted in the reading side of the respective spatial light modulator, wherein the R, G and B color images displayed on the plurality of CRT's are respectively focused onto the writing sides of the spatial light modulators and a plurality of reading lights of R, G and B are outputted from the reading sides of the spatial light modulators by being irradiated by the three light colors of R, G and B so as to be projected as a single composite color image onto a screen by projecting lens means, wherein:

the projecting lens means is disposed on a first level with respect to an optical axis extending therethrough;

the plurality of CRT's are disposed in the first level in such a manner that the plurality of CRT's lie in an identical direction parallel to the optical axis of the projecting lens means;

each of the plurality of spatial light modulators being provided in the first level in front of each of the plurality of CRT's; and the reading light source being disposed in a second level with respect to another optical axis relative to the second level with the second level having a different altitude relative to the first level;

the video projector further comprising:

a 3-color separation member provided in the second level for dividing the light from the reading light source into three colors lights of R, G and B, the 3-color separation member having an input surface for introducing the light from reading light source therein and having first, second and third output surfaces for outputting the three color lights of R, G and B to the respective spatial light modulators, the first output surface facing in a direction parallel to an optical axis of the light from the reading light source, the second and third output surface facing in a direction vertical to the optical axis of the light, said 3-color separation member being constructed as a three dimensional single body with two dichroic filters formed on planar surfaces which intersect at right angles through the center of said 3-color separation member to form a common vertex;

light source reflecting means disposed in the second level for reflecting the light from the reading light source to the input surface of the 3-color separation member at 180° angle;

a plurality of polarizing beam splitter blocks provided corresponding to the plurality of CRT's, each of the plurality of polarizing beam splitter blocks being formed as a single body extending from the first level to the second level so as to have an input surface in the second level for introducing one of the three color lights of R, G and B colors therein and an output surface in the first level for outputting one reading color light from one of the modulators, both the input surface and the output surface of each of the plurality of polarizing beam splitter blocks facing in a direction parallel to the axis of the projecting lens means;

first and second reflecting means provided nearby the second and third output surfaces of the 3-color separation member respectively in the second level for allowing two color lights outputted from the second and third output surfaces of the 3-color separation member to impinge on the input surface of the polarizing beam splitter blocks by altering optical paths of the two color lights at a predetermined angle;

a 3-color composition member provided in the first level for synthesizing a single 3-color composite light image from the three color reading lights of R, G and B which have been modulated and reflected by the plurality of spatial light modulators, the 3-color composition member having first, second and third input surfaces for introducing the three color reading lights and an output surface from which the single 3-color composite light image is outputted, the first input surface facing in a direction parallel to the optical axis of the projecting lens means, both the second input surface and the third input surface thereof facing in a direction vertical to the optical axis of the projecting lens means with said 3-color composition member constructed as a three dimensional single structure having two dichroic filters formed on planar surface intersecting at right angles through the center of said composition member to form a common vertex; with the single 3-color separation member and the single 3-color composition member being stacked upon one another so that the common vertex of each member is in axial alignment; and third and fourth reflecting means provided nearby the second and third input surfaces of the 3-color composition member respectively in the first level to allow two color reading light outputted parallel to the optical axis of the projecting lens means from the output surfaces of the polarizing beam splitter blocks to impinge on the second and third surfaces of the 3-color composition member by altering the optical paths of the two color reading lights at a right angle.

2. A video projector as claimed in claim 1, wherein the predetermined angle is a right angle.

3. A video projector as claimed in claim 1 wherein said 3-color separation member and said 3-color composition member are each constructed as a solid body having a geometric configuration substantially in the shape of a cube.

* * * * *